US 8,521,800 B1

(12) United States Patent
Bergland et al.

(10) Patent No.: US 8,521,800 B1
(45) Date of Patent: Aug. 27, 2013

(54) INTERCONNECTED ARITHMETIC LOGIC UNITS

(75) Inventors: Tyson J. Bergland, Palo Alto, CA (US); Michael J. M. Toksvig, Palo Alto, CA (US); Justin M. Mahan, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 1067 days.

(21) Appl. No.: 11/893,498

(22) Filed: Aug. 15, 2007

(51) Int. Cl.
*G06F 7/38* (2006.01)

(52) U.S. Cl.
USPC .......................................................... 708/523

(58) Field of Classification Search
USPC .......................................................... 708/523
See application file for complete search history.

(56) References Cited

U.S. PATENT DOCUMENTS

| | | | |
|---|---|---|---|
| 4,620,217 A | 10/1986 | Songer | |
| 4,648,045 A | 3/1987 | Demetrescu | |
| 4,700,319 A | 10/1987 | Steiner | |
| 4,862,392 A | 8/1989 | Steiner | |
| 4,901,224 A | 2/1990 | Ewert | |
| 5,185,856 A | 2/1993 | Alcorn et al. | |
| 5,357,604 A | 10/1994 | San et al. | |
| 5,392,393 A | 2/1995 | Deering | |
| 5,491,496 A | 2/1996 | Tomiyasu | |
| 5,577,213 A | 11/1996 | Avery et al. | |
| 5,581,721 A | 12/1996 | Wada et al. | |
| 5,600,584 A | 2/1997 | Schlafly | |
| 5,655,132 A | 8/1997 | Watson | |
| 5,850,572 A | 12/1998 | Dierke | |
| 5,941,940 A * | 8/1999 | Prasad et al. | 708/523 |
| 5,977,977 A | 11/1999 | Kajiya et al. | |
| 6,118,452 A | 9/2000 | Gannett | |
| 6,173,366 B1 | 1/2001 | Thayer et al. | |
| 6,333,744 B1 | 12/2001 | Kirk et al. | |
| 6,351,806 B1 | 2/2002 | Wyland | |
| 6,353,439 B1 | 3/2002 | Lindholm et al. | |
| 6,466,222 B1 | 10/2002 | Kao et al. | |
| 6,496,537 B1 | 12/2002 | Kranawetter et al. | |
| 6,526,430 B1 * | 2/2003 | Hung et al. | 708/523 |
| 6,557,022 B1 * | 4/2003 | Sih et al. | 708/523 |
| 6,624,818 B1 | 9/2003 | Mantor et al. | |
| 6,636,221 B1 | 10/2003 | Morein | |
| 6,636,223 B1 | 10/2003 | Morein | |
| 6,778,181 B1 | 8/2004 | Kilgariff et al. | |

(Continued)

FOREIGN PATENT DOCUMENTS

| | | |
|---|---|---|
| JP | 62080785 A2 | 4/1987 |
| JP | 05150979 A2 | 6/1993 |

(Continued)

OTHER PUBLICATIONS

"Intervealed Memory" http://www.webopedia.com/TERM/1/intervealed.sub.—memory.html.cited by other.

(Continued)

*Primary Examiner* — Tan V Mai

(57) ABSTRACT

An arithmetic logic stage in a graphics pipeline includes a number of arithmetic logic units (ALUs). The ALUs each include, for example, a multiplier and an adder. The ALUs are interconnected by circuitry that, for example, routes the output from the multiplier in one ALU to both the adder in that ALU and an adder in another ALU.

15 Claims, 4 Drawing Sheets

(56) References Cited

U.S. PATENT DOCUMENTS

| | | |
|---|---|---|
| 6,806,886 B1 | 10/2004 | Zatz |
| 6,839,828 B2 | 1/2005 | Gschwind et al. |
| 6,924,808 B2 | 8/2005 | Kurihara et al. |
| 6,947,053 B2 | 9/2005 | Malka et al. |
| 6,980,209 B1 | 12/2005 | Donham et al. |
| 6,999,100 B1 | 2/2006 | Leather et al. |
| 7,280,112 B1 | 10/2007 | Hutchins |
| 7,293,375 B2 | 11/2007 | Fukushima et al. |
| 7,298,375 B1 | 11/2007 | Hutchins |
| 7,477,260 B1 | 1/2009 | Nordquist |
| 7,659,909 B1 | 2/2010 | Hutchins |
| 7,710,427 B1 | 5/2010 | Hutchins et al. |
| 7,928,990 B2 | 4/2011 | Jiao et al. |
| 7,941,645 B1 | 5/2011 | Riach et al. |
| 2002/0129223 A1 | 9/2002 | Takayama et al. |
| 2002/0169942 A1 | 11/2002 | Sugimoto |
| 2003/0115233 A1* | 6/2003 | Hou et al. ............. 708/400 |
| 2004/0114813 A1 | 6/2004 | Boliek et al. |
| 2004/0130552 A1 | 7/2004 | Duluk et al. |
| 2005/0122330 A1 | 6/2005 | Boyd et al. |
| 2005/0135433 A1 | 6/2005 | Chang et al. |
| 2005/0223195 A1 | 10/2005 | Kawaguchi |
| 2006/0028469 A1 | 2/2006 | Engel |
| 2006/0152519 A1 | 7/2006 | Hutchins et al. |
| 2006/0155964 A1 | 7/2006 | Totsuka |
| 2006/0177122 A1 | 8/2006 | Yasue |
| 2006/0288195 A1 | 12/2006 | Ma et al. |
| 2007/0279408 A1 | 12/2007 | Zheng et al. |
| 2007/0285427 A1 | 12/2007 | Morein et al. |

FOREIGN PATENT DOCUMENTS

| | | |
|---|---|---|
| JP | 07084965 | 3/1995 |
| JP | 08161169 | 6/1996 |
| JP | 11053187 A2 | 2/1999 |
| JP | 2000047872 A2 | 2/2000 |
| JP | 2002073330 A2 | 3/2002 |
| JP | 2002171401 | 6/2002 |
| JP | 2004199222 | 7/2004 |
| JP | 2004303026 | 10/2004 |
| JP | 2006196004 | 7/2006 |
| WO | 2005114646 A2 | 12/2005 |

OTHER PUBLICATIONS

Pirazzi, Chris. "Fields, F1/F2, Interleave, Field Dominance and More." http://www.lurkertech.com/lg/domincance.html. cited by other.

Moller, et al.; Real-Time Rendering, 2nd ed., 2002, A K Peters Ltd., pp. 92-99, 2002.

Hennessy, et al., Computer Organization and Design: The Hardware/Software Interface, 1997, Section 6.5.

Hollasch; IEEE Standard 754 Floating Point Numbers; http://steve.hollasch.net/cgindex/coding/ieeefloat.html; dated Feb. 24, 2005; retrieved Oct. 21, 2010.

Microsoft; (Complete) Tutorial to Understand IEEE Floating-Point Errors; http://support.microsoft.com/kb/42980; dated Aug. 16, 2005; retrieved Oct. 21, 2010.

The Free Online Dictionary, Thesaurus and Encyclopedia, definition for cache; http://www.thefreedictionary.com/ cache; retrieved Aug. 17, 2012.

* cited by examiner

| Operation → | DP4 | 2 DP2a | DP3a+MAD | 2 DP 2 | DP2a+MADs | DP3+MAD | 4 MADs |
|---|---|---|---|---|---|---|---|
| ALU 301 | receive | inputs used | inputs used | receive | inputs used | receive | used for MAD |
| ALU 302 | send | send | send | inputs used | send | send | used for MAD |
| ALU 303 | send | inputs used | send | receive | used for MAD | used for MAD | used for MAD |
| ALU 304 | inputs used | send | used for MAD | inputs used | used for MAD | inputs used | used for MAD |
| Results | ALU 301 | ALUs 301, 303 | DP3a: ALU 301<br>MAD: ALU 304 | ALUs 301, 303 | DP2a: ALU 301<br>MAD: ALUs 303, 304 | DP3: ALU 301<br>MAD: ALU 303 | MADs: ALUs 301, 302, 303, 304 |

FIG. 4

INTERCONNECTED ARITHMETIC LOGIC UNITS

FIELD

The present invention generally relates to computer graphics.

BACKGROUND

Recent advances in computer performance have enabled graphics systems to provide more realistic graphical images using personal computers, home video game computers, handheld devices, and the like. In such graphics systems, a number of procedures are executed to render or draw graphics primitives to the screen of the system. A graphics primitive is a basic component of a graphic, such as a point, line, polygon, or the like. Rendered images are formed with combinations of these graphics primitives. Many procedures may be utilized to perform three-dimensional (3-D) graphics rendering.

Specialized graphics processing units (GPUs) have been developed to increase the speed at which graphics rendering procedures are executed. The GPUs typically incorporate one or more rendering pipelines. Each pipeline includes a number of hardware-based functional units that are designed for high-speed execution of graphics instructions/data. Generally, the instructions/data are fed into the front end of a pipeline and the computed results emerge at the back end of a pipeline. The hardware-based functional units, cache memories, firmware, and the like, of the GPUs are designed to operate on the basic graphics primitives and produce real-time rendered 3-D images.

There is increasing interest in rendering 3-D graphical images in portable or handheld devices such as cell phones, personal digital assistants (PDAs), and other devices where power consumption is an important design consideration. However, portable or handheld devices generally have reduced capabilities relative to more full-sized devices such as desktop computers. The desire is to quickly perform realistic 3-D graphics rendering in a handheld device, within the capabilities of such devices.

SUMMARY

Embodiments of the present invention provide methods and systems for performing 3-D graphics rendering in an electronic device such as a portable or handheld device. In one embodiment, an arithmetic logic stage in a graphics pipeline includes a number of arithmetic logic units (ALUs). The ALUs each include, for example, a multiplier and an adder. The ALUs are interconnected by circuitry that is software-programmable and can be configured on-the-fly. Thus, for example, output from the multiplier in one ALU can be routed to both the adder in that ALU and an adder in another ALU, and an adder can receive data from more than one multiplier.

Because the interconnecting circuitry is programmable, the ALUs are reusable—that is, the same adders and multipliers can be used to perform one type of operation in one pass and another type of operation in another pass. Thus, for example, the ALUs can be programmed to implement a multiply-add operation in one pass and a multidimensional dot product computation in a second pass.

In one embodiment, the ALUs are analogous to one another but the interconnecting circuitry is asymmetrical. In this embodiment, the programming of each ALU is nevertheless symmetrical for ease of programming.

In general, according to embodiments of the present invention, multipliers and adders can be shared between ALUs. As a result, relatively complex, multidimensional operations can be performed in a single pass through the arithmetic logic stage of a graphics pipeline. Accordingly, graphics operations can be efficiently performed without a commensurate increase in the amount of hardware. As such, the ALUs are well-suited for use in a portable or handheld device where space is at a premium and where power consumption is a key consideration.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

FIG. 4 is a table summarizing programming instructions for an arithmetic logic stage according to one embodiment of the present invention.

DETAILED DESCRIPTION

Figure 1:
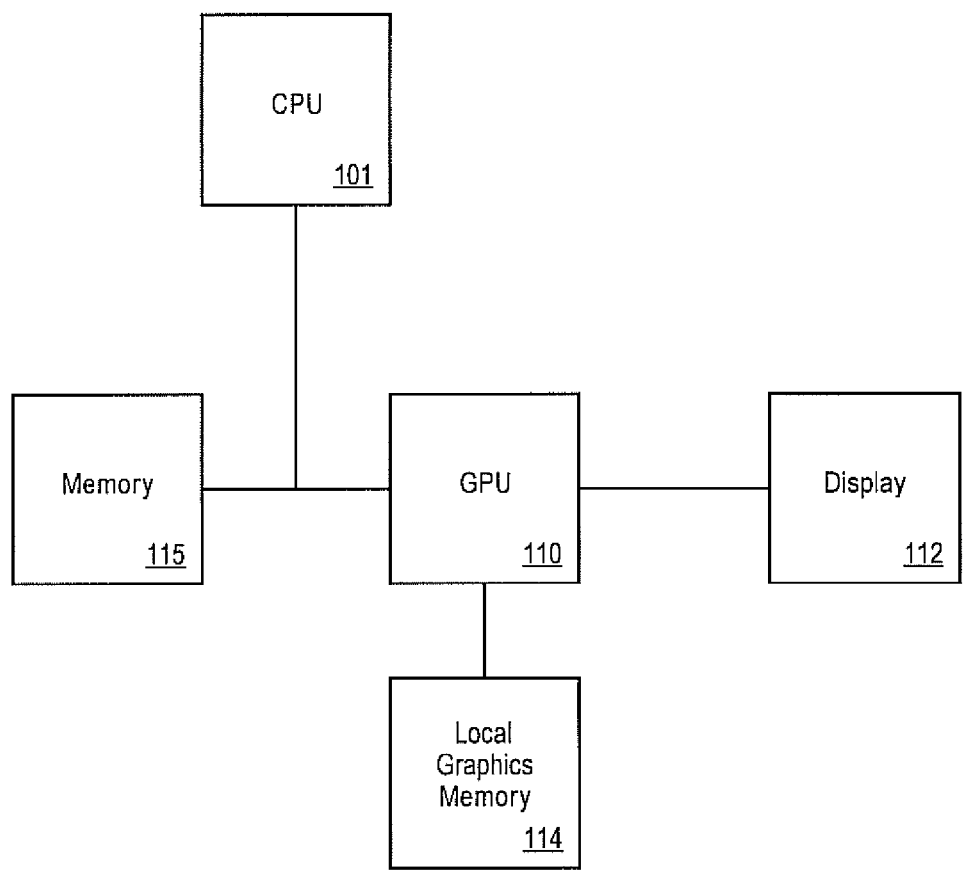
FIG. 1 is a block diagram showing components of a computer system in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sending" or "receiving" or "performing" or "routing" or "programming" or "configuring" or "selecting" or the like, refer to the actions and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 shows a computer system 100 in accordance with one embodiment of the present invention. The computer system includes the components of a basic computer system in accordance with embodiments of the present invention providing the execution platform for certain hardware-based and software-based functionality. In general, the computer system comprises at least one central processing unit (CPU) 101, a system memory 115, and at least one graphics processor unit (GPU) 110. The CPU can be coupled to the system memory via a bridge component/memory controller (not shown) or can be directly coupled to the system memory via a memory controller (not shown) internal to the CPU. The GPU is coupled to a display 112. One or more additional GPUs can optionally be coupled to system 100 to further increase its computational power. The GPU(s) is/are coupled to the CPU and the system memory. The computer system can be implemented as, for example, a desktop computer system or server computer system, having a powerful general-purpose CPU coupled to a dedicated graphics rendering GPU. In such an embodiment, components can be included that add peripheral buses, specialized graphics memory, input/output (I/O) devices, and the like. Similarly, computer system can be implemented as a handheld device (e.g., a cell phone, etc.) or a set-top video game console device.

The GPU can be implemented as a discrete component, a discrete graphics card designed to couple to the computer system via a connector (e.g., an Accelerated Graphics Port slot, a Peripheral Component Interconnect-Express slot, etc.), a discrete integrated circuit die (e.g., mounted directly on a motherboard), or an integrated GPU included within the integrated circuit die of a computer system chipset component (not shown) or within the integrated circuit die of a PSOC (programmable system-on-a-chip). Additionally, a local graphics memory 114 can be included for the GPU for high bandwidth graphics data storage.

Figure 2:
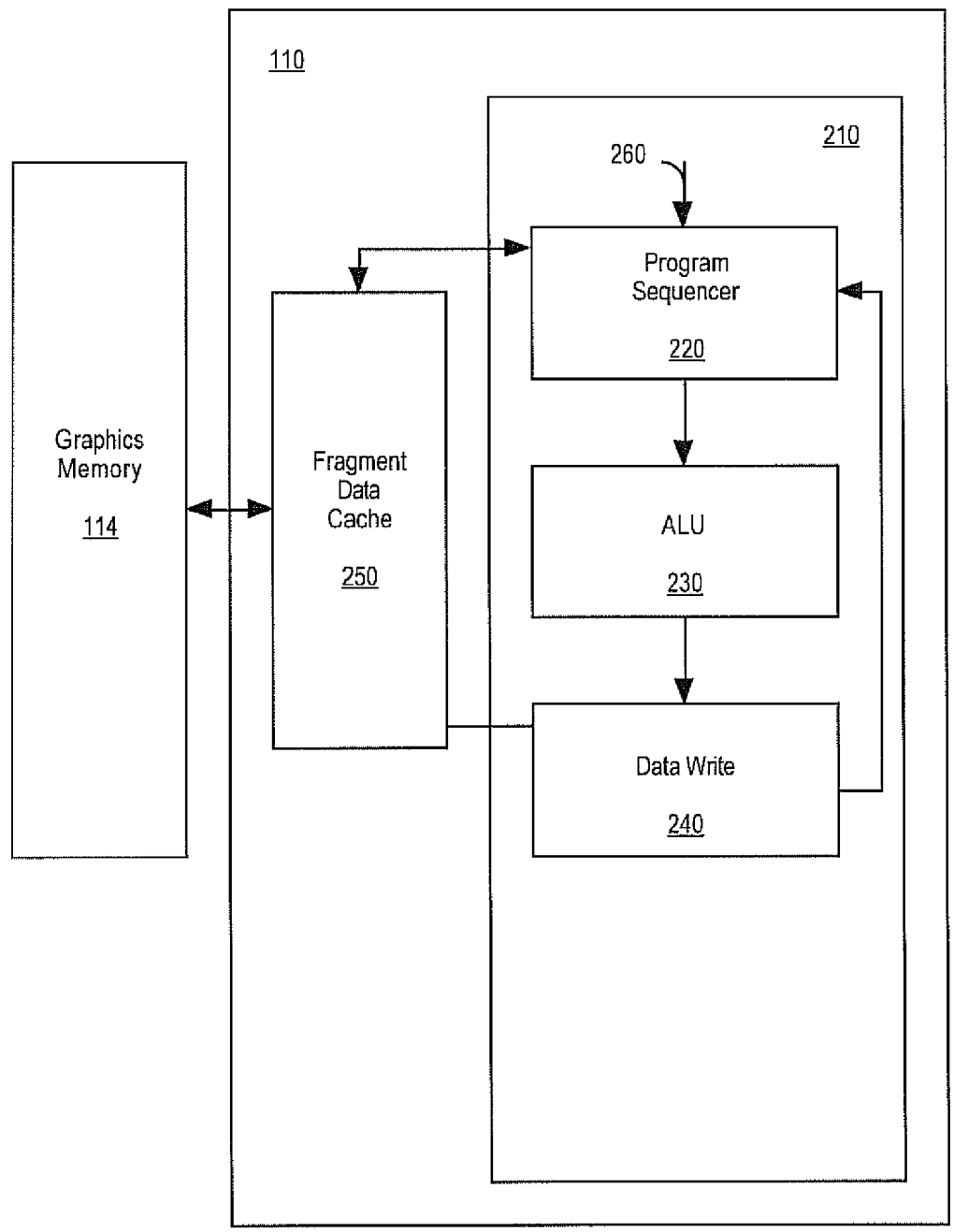
FIG. 2 is a block diagram showing components of a graphics processing unit (GPU) in accordance with one embodiment of the present invention.

FIG. 2 shows a diagram 200 illustrating internal components of the GPU 110 and the graphics memory 114 in accordance with one embodiment of the present invention. As depicted in FIG. 2, the GPU includes a graphics pipeline 210 and a fragment data cache 250 which couples to the graphics memory as shown.

In the example of FIG. 2, a graphics pipeline 210 includes a number of functional modules. Three such functional modules of the graphics pipeline—for example, the program sequencer 220, the arithmetic logic stage (ALU) 230, and the data write component 240—function by rendering graphics primitives that are received from a graphics application (e.g., from a graphics driver, etc.). The functional modules 220-240 access information for rendering the pixels related to the graphics primitives via the fragment data cache 250. The fragment data cache functions as a high-speed cache for the information stored in the graphics memory (e.g., frame buffer memory).

The program sequencer functions by controlling the operation of the functional modules of the graphics pipeline. The program sequencer can interact with the graphics driver (e.g., a graphics driver executing on the CPU 101 of FIG. 1) to control the manner in which the functional modules of the graphics pipeline receive information, configure themselves for operation, and process graphics primitives. For example, in the FIG. 2 embodiment, graphics rendering data (e.g., primitives, triangle strips, etc.), pipeline configuration information (e.g., mode settings, rendering profiles, etc.), and rendering programs (e.g., pixel shader programs, vertex shader programs, etc.) are received by the graphics pipeline over a common input 260 from an upstream functional module (e.g., from an upstream raster module, from a setup module, or from the graphics driver). The input 260 functions as the main fragment data pathway, or pipeline, between the functional modules of the graphics pipeline. Primitives are generally received at the front end of the pipeline and are progressively rendered into resulting rendered pixel data as they proceed from one module to the next along the pipeline.

In one embodiment, data proceeds between the functional modules 220-240 in a packet-based format. For example, the graphics driver transmits data to the GPU in the form of data packets, or pixel packets, that are specifically configured to interface with and be transmitted along the fragment pipe communications pathways of the pipeline. A pixel packet generally includes information regarding a group or tile of pixels (e.g., four pixels, eight pixels, 16 pixels, etc.) and coverage information for one or more primitives that relate to the pixels. A pixel packet can also include sideband information that enables the functional modules of the pipeline to configure themselves for rendering operations. For example, a pixel packet can include configuration bits, instructions, functional module addresses, etc., that can be used by one or more of the functional modules of the pipeline to configure itself for the current rendering mode, or the like. In addition to pixel rendering information and functional module configuration information, pixel packets can include shader program instructions that program the functional modules of the pipeline to execute shader processing on the pixels. For example, the instructions comprising a shader program can be transmitted down the graphics pipeline and be loaded by one or more designated functional modules. Once loaded, during rendering operations, the functional module can execute the shader program on the pixel data to achieve the desired rendering effect.

In this manner, the highly optimized and efficient fragment pipe communications pathway implemented by the functional modules of the graphics pipeline can be used not only to transmit pixel data between the functional modules (e.g., modules 220-240), but to also transmit configuration information and shader program instructions between the functional modules.

Figure 3:
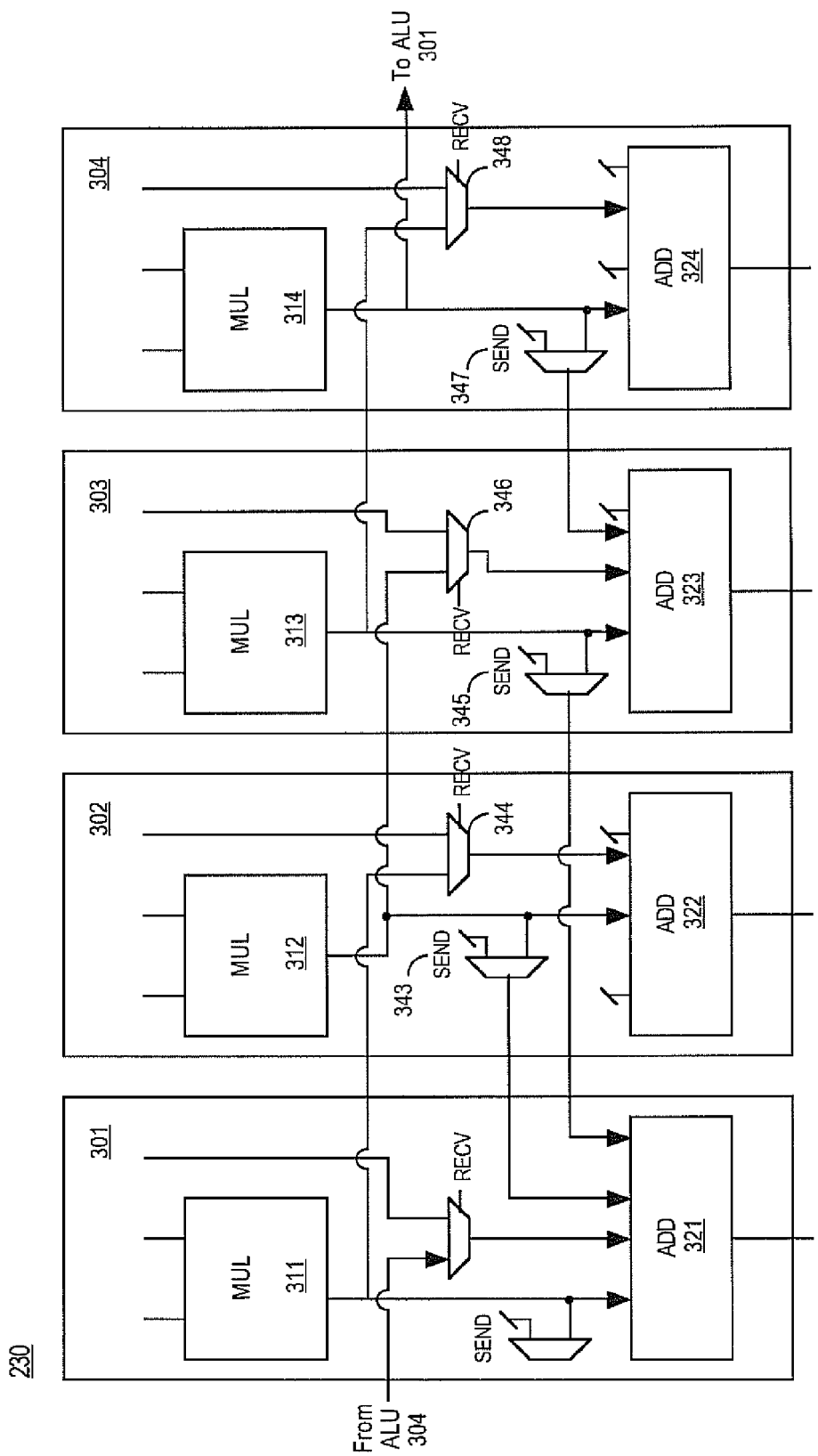
FIG. 3 is a block diagram of an arithmetic logic stage in a GPU according to one embodiment of the present invention.

FIG. 3 is a block diagram of an arithmetic logic stage 230 according to one embodiment of the present invention. In the example of FIG. 3, the ALU stage 230 includes an ALU 301, an ALU 302, an ALU 303, and an ALU 304. Each of the ALUs 301-304 includes a first digital circuit for performing a first type of mathematical operation and a second type of digital circuit for performing a second type of mathematical operation. More specifically, in one embodiment, the ALU 301 includes a multiplier 311 and an adder 321, the ALU 302 includes a multiplier 312 and an adder 322, the ALU 303 includes a multiplier 313 and an adder 323, and the ALU 304 includes a multiplier 314 and an adder 324.

As will be seen, the ALUs 301-304 are interconnected such that, for example, an adder in the arithmetic logic stage 230 can receive data from more than one multiplier in the stage, and a multiplier in the arithmetic logic stage can send data to more than one adder in the stage. Therefore, generally speaking, arithmetic logic stage 230 includes a number of multipliers, a number of adders, and circuitry that interconnects the multipliers and adders. However, the adders and multipliers in the ALU stage 230 can be conveniently abstracted into separate ALUs.

Within each of the ALUs 301-304, the multiplier and the adder are coupled in series. That is, for example, the multiplier 311 and adder 321 of the ALU 301 are coupled in series, such that an output of the multiplier 311 can be received by the adder 321. The other ALUs 302-304 are similarly arranged.

In the embodiment of FIG. 3, each of the ALUs 301-304 receives three inputs or operands A, B and C. The ALU 301, for example, receives operands A1, B1 and C1. The operand A1 and the operand B1 are input to the multiplier 301. The operand C1 bypasses the multiplier 301 and is optionally input to the adder 321, as described in more detail below. The inputs/operands for the other ALUs 302-304 are similarly distributed.

As mentioned above, the ALU stage 230 includes circuitry that interconnects the various multipliers and adders in the ALUs 301-304. In the example of FIG. 3, each of the ALUs 301-304 includes two multiplexers (collectively, multiplexers 341-348).

Thus, in many respects—for example, the number and arrangement of adders, multipliers and multiplexers, and the number of inputs—the ALUs 301-304 are analogous. The analogous nature of the ALUs means less wiring and better timing, while still providing desired flexibility and functionality (as will be seen).

In the embodiment of FIG. 3, one of the inputs to multiplexer 341 and the output of multiplexer 341 are "tied off"— that is, they are not connected to another component in the ALU stage 230. Thus, in the example of FIG. 3, multiplexer 341 is not used for routing data or interconnecting the ALUs. However, by including multiplexer 341 as depicted, the hardware within each of the ALUs is symmetrically (analogously) arranged (with the exception of some of the wiring within each ALU). As alternatives to the example depicted in FIG. 3, multiplexer 341 can be removed, or it can be connected to one of the adders like its counterparts in ALUs 302-304.

In the embodiment of FIG. 3, the multiplexers 343, 345 and 347 are each controlled separately using programming code (e.g., a one-bit select or control signal). These control signals are labeled "SEND" in FIG. 3, and the multiplexers 343, 345 and 347 may be referred to herein as the "send" multiplexers. Depending on the values of the control signals, the outputs of the multipliers 312-314 may or may not be sent to multiple adders. More specifically, the output of the multiplier 312 is sent to the adder 322 and may or may not be sent to the adder 321, depending on how the multiplexer 343 is programmed. Similarly, the output of the multiplier 313 is sent to the adder 323 and may or may not be sent to the adder 321 (depending on the programming of the multiplexer 345), and the output of the multiplier 314 is sent to the adder 324 and may or may not be sent to the adder 323 (depending on the programming of the multiplexer 347). In the example of FIG. 3, one of the inputs of each of the multiplexers 343, 345 and 347 is tied off because those inputs are not needed to perform the functionality just described.

The multiplexers 343, 345 and 347 select between the output of their respective multiplier and zero (the tied off input). Thus, an enable signal need not be sent to or received by the adders 321 and 323—they simply use the values presented to them by the send multiplexers, either a multiplier output or a value of zero. The send multiplexers could be implemented within the ALUs 301 and 303 (which include the adders 321 and 323), but then the analogous nature of the ALUs and the benefits provided (e.g., less wiring, better timing) would not be preserved.

Also, in the example of FIG. 3, each of the adders 321-324 is a four-input adder, although one or more of the inputs to some of the adders is tied off. Thus, the adders each will always add four inputs, although some of those inputs (the tied off inputs) will always be zero. Thus, in a manner similar to that described above, extra control signals are not needed, nor is it necessary to chain smaller adders—the adders simply use the values presented to them. Adders other than four-input adders could be substituted for the adders with tied off inputs, but then the analogous nature of the ALUs and the benefits provided (e.g., less wiring, better timing) would not be preserved.

In the embodiment of FIG. 3, the multiplexers 342, 344, 346 and 348 are each controlled separately using programming code (e.g., a one-bit control signal). These control signals are labeled "RECV" in FIG. 3, and the multiplexers 342, 344, 346 and 348 may be referred to herein as the "receive" multiplexers. Operands for the various adders 321-324 are selected depending on the programming of the multiplexers 342, 344, 346 and 348. More specifically, the multiplexer 342 selects either the input value C1 (which bypasses the multiplier 311) or the output of the multiplier 314 as one of the operands for the adder 321, depending on how the multiplexer 342 is programmed. Similarly, the multiplexer 344 selects either the input value C2 or the output of the multiplier 311 as one of the operands for the adder 322, the multiplexer 346 selects either the input value C3 or the output of the multiplier 312 as one of the operands for the adder 323, and the multiplexer 348 selects either the input value C4 or the output of the multiplier 313 as one of the operands for the adder 324.

Thus, in one embodiment, the ALUs 301-304 each receives a two-bit control signal: one bit of the signal (the SEND bit) is for controlling each ALU's send multiplexer, and one bit of the signal (the RECV bit) is for controlling each ALU's receive multiplexer. As mentioned above, the multiplexer 341 is not utilized, and as such a control signal is not necessary for the ALU 301. Nevertheless, in the present embodiment, a two-bit control signal is used for the ALU 301. Thus, even though the ALUs may be asymmetrical, the control signals are symmetrical, which facilitates programming.

To summarize the example of FIG. 3, the operands that are input to the adder 321 can include: the output of the multiplier 311; either operand C1 or the output of the multiplier 314; optionally the output of the multiplier 312; and optionally the output of the multiplier 313. The operands of the adder 322 can include: the output of the multiplier 312; and either operand C2 or the output of the multiplier 311. The operands of the adder 323 can include: the output of the multiplier 313; either operand C3 or the output of the multiplier 312; and optionally the output of the multiplier 314. The operands of the adder 324 can include: the output of the multiplier 314; and either the operand C4 or the output of the multiplier 313.

The interconnecting circuitry—specifically, the multiplexers 342-348 in the example of FIG. 3—is software-programmable and can be configured in different ways to perform various multidimensional operations in a single pass through the ALU stage 230. That is, the inputs A1-A4, B1-B4 and C1-C4, or the subset of those inputs that are needed for the prescribed operation, are received at the "top" of the ALU stage 230. The prescribed multidimensional operation is performed, and the result is output from the "bottom" of the ALU stage 230. Thus, the output of the ALU stage 230 does not necessarily have to be recirculated back through the ALU stage in order to complete the operation.

The types of operations that can be performed by the ALU stage 230 in a single pass include, for example: a four-dimensional dot product (DP4); a three-dimensional dot product with scalar add and multiply-add (DP3+MAD); a three-dimensional dot product and multiply-add (DP3+MAD); up to four multiply-adds (4 MADs); two two-dimensional dot products with scalar adds (2 DP2a); two two-dimensional dot products with scalar add and two multiply-adds (2 DP2a+2 MADs); and two, three or four two-dimensional dot products (2, 3 or 4 DP2). Other types of operations may also be performed in single pass. Because the interconnecting circuitry is programmable, the same adders and multipliers can be used to perform one type of operation in one pass and another type of operation in another pass.

The interconnecting circuitry may be different from that illustrated and described by the example of FIG. 3. That is, there may be different ways to route the data between ALUs in order to accomplish operations such as those mentioned above. In the extreme, the interconnecting circuitry (including multiplexers) may be designed to implement a full crossbar embodiment. In such an embodiment, the interconnecting circuitry allows the output of any one of the multipliers to be routed to any one of or any combination of the adders. A full crossbar embodiment is advantageous because of the flexibility it provides. The embodiment of FIG. 3 is advantageous because it provides the flexibility of a full crossbar, but reduces the amount of hardware and simplifies the routing of the interconnecting circuitry relative to a full crossbar design.

Although four multipliers and four adders are described above, the present invention is not so limited. That is, more than four multipliers (e.g., eight or 16) and more than four adders (e.g., eight or 16) can be interconnected in a manner similar to that described above.

FIG. 4 is a table 400 summarizing programming instructions for an arithmetic logic stage 230 (FIG. 3) according to one embodiment of the present invention. As illustrated in FIG. 3, each of the ALUs 301-304 can receive three inputs A, B and C from the preceding stage of the graphics pipeline. In the pipeline stage preceding the arithmetic logic stage 230, the pixel data is manipulated so that the correct data is properly distributed to the correct ALU in order to perform the operations about to be described. In other words, the ALUs 301-304 simply operate on the data presented to them; other parts of the pipeline are programmed to deliver the correct data to the ALUs.

For a DP4 operation, the multiplexer 342 is programmed to receive the output of the multiplier 314 (that is, it selects the output of the multiplier 314 as an input to the adder 321), the multiplexer 343 is programmed to send the output of the multiplier 312 to the adder 321, and the multiplexer 345 is programmed to send the output of the multiplier 313 to the adder 321. Also, the adder 321 will receive the output of the multiplier 311 as an input. The multiplier 311 performs A1*B1; the multiplier 312 performs A2*B2; the multiplier 313 performs A3*B3; the multiplier 314 performs A4*B4; and the adder 321 adds each of those results (A1*B1+A2*B2+A3*B3+A4*B4). The output of the ALU 301 is the result of the DP4 operation.

For two DP2a operations, the multiplexer 343 is programmed to send the output of the multiplier 312 to the adder 321, and the multiplexer 347 is programmed to send the output of the multiplier 314 to the adder 323. Also, the adder 321 will receive the output of the multiplier 311 and C1 as inputs, and the adder 323 will receive the output of the multiplier 313 and C3 as inputs. The multiplier 311 performs A1*B1; the multiplier 312 performs A2*B2; the multiplier 313 performs A3*B3; and the multiplier 314 performs A4*B4. The adder 321 adds A1*B1+A2*B2+C1, and the adder 323 adds A3*B3+A4*B4+C3. The output of the ALU 301 is the result of the first of the two DP2a operations, and the output of the ALU 303 is the result of the second of the two DP2a operations.

For a DP3a+MAD operation, the multiplexer 343 is programmed to send the output of the multiplier 312 to the adder 321, and the multiplexer 345 is programmed to send the output of the multiplier 313 to the adder 321. Also, the adder 321 will receive the output of the multiplier 311 and C1 as inputs, and the adder 324 will receive the output of the multiplier 314 and C4 as inputs. The multiplier 311 performs A1*B1; the multiplier 312 performs A2*B2; the multiplier 313 performs A3*B3; and the multiplier 314 performs A4*B4. The adder 321 adds A1*B1+A2*B2+A3*B3+C1, and the adder 324 adds A4*B4+C4. The output of the ALU 301 is the result of the DP3a operation, and the output of the ALU 304 is the result of the MAD operation.

For a two DP2 operation, the multiplexer 342 is programmed to receive the output of the multiplier 314 (that is, it selects the output of the multiplier 314, A4*B4, as an input to the adder 321) and the multiplexer 346 is programmed to receive the output of the multiplier 312 (that is, it selects the output of the multiplier 312, A2*B2, as an input to the adder 323). Also, the adder 321 will receive the output of the multiplier 311 (A1*B1) as an input, and the adder 323 will receive the output of the multiplier 313 (A3*B3) as an input. The adder 321 adds A1*B1+A4*B4, and the adder 323 adds A2*B2+A3*B3. The output of the ALU 301 is the result of the first of the two DP2 operations, and the output of the ALU 303 is the result of the second of the two DP2 operations.

For a four DP2 operation, the output of the ALU 302 and the output of the ALU 304 can be used to provide the results of the third and fourth DP2 operations. The multiplexer 344 is programmed to receive the output of the multiplier 311 (A1*B1) as an input for the adder 322, and the multiplexer 348 is programmed to receive the output of the multiplier 313 (A3*B3) as an input for adder 324. Also, the adder 322 will receive the output of the multiplier 312 (A2*B2) as an input, and the adder 324 will receive the output of the multiplier 314 (A4*B4) as an input. The adder 322 adds A1*B1+A2*B2, and the adder 324 adds A3*B3+A4*B4. In a similar manner, a three DP2 operation can be performed using the output of any combination of three of the four ALUs.

For a DP2a+two MADs operation, the multiplexer 343 is programmed to send the output of the multiplier 312 (A2*B2) to the adder 321. Also, the adder 321 will receive the output of the multiplier 311 (A1*B1) and C1 as inputs, the adder 323 will receive the output of the multiplier 313 (A3*B3) and C3 as inputs, and the adder 324 will receive the output of the multiplier 314 (A4*B4) and C4 as inputs. The adder 321 adds A1*B1+A2*B2+C1, the adder 323 adds A3*B3+C3, and the adder 324 adds A4*B4+C4. The output of the ALU 301 is the result of the DP2a operation, the output of the ALU 303 is the result of one of the two MADs, and the output of the ALU 304 is the result of the other of the two MADs.

For a DP3+MAD operation, the multiplexer 342 is programmed to receive the output of the multiplier 314 (that is, it selects the output of the multiplier 314, A4*B4, as an input to the adder 321), and the multiplexer 343 is programmed to send the output of the multiplier 312 (A2*B2) to the adder 321. Also, the adder 321 will receive the output of the multiplier 311 (A1*B1) as an input, and the adder 323 will receive the output of the multiplier 313 (A3*B3) and C3 as inputs. The adder 321 adds A1*B1+A2*B2+A4*B4, and the adder 323 adds A3*B3+C3. The output of the ALU 301 is the result of the DP3 operation, and the output of the ALU 303 is the result of the MAD operation.

For a four MADs operation, each of the adders 321-324 receives the output of its respective multiplier 311-314 as one input and a respective input value C1-C4 as its other input. Each of the ALUs 301-304 outputs a result of one of the four MADs.

The foregoing descriptions of specific embodiments of the present invention have been presented for purposes of illustration and description. They are not intended to be exhaustive or to limit the invention to the precise forms disclosed, and many modifications and variations are possible in light of the above teaching. For example, embodiments of the present invention can be implemented on GPUs that are different in form or function from GPU 110 of FIG. 2. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An arithmetic logic stage in a graphics pipeline, the stage comprising:
   a plurality of arithmetic logic units (ALUs) comprising a first ALU, a second ALU, a third ALU and a fourth ALU, each of the ALUs comprising a first digital circuit operable for performing a first type of operation and a second digital circuit operable for performing a second type of operation; and
   circuitry interconnecting the ALUs, the circuitry operable for routing data that is output from the first digital circuit of the first ALU to both the second digital circuit of the second ALU and the second digital circuit of the third ALU, wherein the circuitry comprises:
   a first multiplexer coupled between the first digital circuit of the first ALU and the second digital circuit of the second ALU, wherein the first multiplexer is operable for selecting the data as an operand for the second digital circuit of the second ALU; and
   a second multiplexer coupled between the first digital circuit of the first ALU and the second digital circuit of the third ALU, wherein the second multiplexer is operable for forwarding the data to the second digital circuit of the third ALU.

2. The arithmetic logic stage of claim 1 wherein the first digital circuit comprises a multiplier and the second digital circuit comprises an adder, wherein the first type of operation comprises multiplication and the second type of operation comprises addition.

3. The arithmetic logic stage of claim 1 wherein the plurality of ALUs are operable for performing multidimensional computations in a single pass, the multidimensional computations selected from the group consisting of: four-dimensional dot product; three-dimensional dot product with scalar add and multiply-add; three-dimensional dot product and multiply-add; up to four multiply-adds; two two-dimensional dot products with scalar adds; two two-dimensional dot products with scalar add and two multiply-adds; two two-dimensional dot products; three two-dimensional dot products; and four two-dimensional dot products.

4. The arithmetic logic stage of claim 1 wherein each of the ALUs receives a two-bit control signal for controlling the routing of data.

5. An arithmetic logic stage in a computer graphics pipeline, the stage comprising:
   a plurality of multipliers comprising a first multiplier, a second multiplier, a third multiplier and a fourth multiplier;
   a plurality of adders comprising a first adder that receives an output of the first multiplier as a first operand, wherein further the first adder is coupled to a first multiplexer that is operable for selecting a second operand for the first adder, wherein further the first adder is coupled to a second multiplexer that is operable for selecting a third operand for the first adder, wherein the third operand comprises an output of one of the second, third and fourth multipliers; and
   software-configurable circuitry that interconnects the plurality of multipliers to the plurality of adders, the circuitry configurable to allow an adder to receive data from more than one of the multipliers and to allow data to be sent from a multiplier to more than one of the adders.

6. The arithmetic logic stage of claim 5 wherein the circuitry comprises a plurality of multiplexers.

7. The arithmetic logic stage of claim 5 wherein the second operand comprises an input to the arithmetic logic stage that bypasses the multipliers.

8. The arithmetic logic stage of claim 5 wherein the second operand comprises an output of one of the second, third and fourth multipliers.

9. The arithmetic logic stage of claim 5 wherein further the first adder is coupled to a third multiplexer that is operable for selecting a fourth operand for the first adder, wherein the fourth operand comprises an output of one of the second, third and fourth multipliers.

10. The arithmetic logic stage of claim 5 wherein the plurality of multipliers and the plurality of adders in combination are operable for performing multidimensional computations in a single pass through the arithmetic logic stage, the multidimensional computations selected from the group consisting of: four-dimensional dot product; three-dimensional dot product with scalar add and multiply-add; three-dimensional dot product and multiply-add; up to four multiply-adds; two two-dimensional dot products with scalar adds; two two-dimensional dot products with scalar add and two multiply-adds; two two-dimensional dot products; three two-dimensional dot products; and four two-dimensional dot products.

11. An arithmetic logic stage in a graphics pipeline, the arithmetic logic stage comprising:
   a first arithmetic logic unit (ALU) comprising a first multiplier and a first adder coupled in series;
   a second ALU comprising a second multiplier and a second adder coupled in series;
   a third ALU comprising a third multiplier and a third adder coupled in series;
   a fourth ALU comprising a fourth multiplier and a fourth adder coupled in series; and
   circuitry operable for coupling an output of the first multiplier to the second adder, an output of the second multiplier to the third adder, an output of the third multiplier to the fourth adder, and an output of the fourth multiplier to the first adder, the circuitry further operable for coupling an output of the second multiplier to the first adder, an output of the third multiplier to the first adder, and an output of the fourth multiplier to the third adder.

12. The arithmetic logic stage of claim 11 wherein the circuitry comprises a plurality of multiplexers comprising:

a first multiplexer coupled to an input of the first adder and operable for selecting between the output of the third multiplier and an input to the first ALU;

a second multiplexer coupled to the output of the second multiplier and operable for selecting between sending and not sending the output of the second multiplier to the first adder;

a third multiplexer coupled to an input of the second adder and operable for selecting between the output of the first multiplier and an input to the second ALU;

a fourth multiplexer coupled to the output of the third multiplier and operable for selecting between sending and not sending the output of the third multiplier to the first adder;

a fifth multiplexer coupled to an input of the third adder and operable for selecting between the output of the second multiplier and an input to the third ALU;

a sixth multiplexer coupled to the output of the fourth multiplier and operable for selecting between sending and not sending the output of the fourth multiplier to the third adder; and a seventh multiplexer coupled to an input of the fourth adder and operable for selecting between the output of the third multiplier and an input to the fourth ALU.

13. The arithmetic logic stage of claim 11 wherein the first, second, third and fourth ALUs are operable for performing multidimensional computations in a single pass, the multidimensional computations selected from the group consisting of: four-dimensional dot product; three-dimensional dot product with scalar add and multiply-add; three-dimensional dot product and multiply-add; up to four multiply-adds; two two-dimensional dot products with scalar adds; two two-dimensional dot products with scalar add and two multiply-adds; two two-dimensional dot products; three two-dimensional dot products; and four two-dimensional dot products.

14. The arithmetic logic stage of claim 11 wherein the first, second, third and fourth ALUs each receives a two-bit control signal for configuring the circuitry.

15. The arithmetic logic stage of claim 11 wherein the circuitry is programmable in software, wherein the circuitry is dynamically configurable on the fly.

* * * * *